United States Patent [19]
Zenhausern

[11] 3,776,650
[45] Dec. 4, 1973

[54] CONNECTING DEVICE
[76] Inventor: Heinrich Zenhausern, Birmensdorferstrasse 134, Urdorf, Switzerland
[22] Filed: Aug. 17, 1971
[21] Appl. No.: 172,399

[30] Foreign Application Priority Data
Aug. 19, 1970 Switzerland.................. 12435/70

[52] U.S. Cl............................. 403/191, 287/114
[51] Int. Cl............................................. F16b 7/00
[58] Field of Search................. 287/20.3, 56, 54 C, 287/54 A, 52.06, 114; 182/228; 85/79, 4; 339/273 R

[56] References Cited
UNITED STATES PATENTS
| | | | |
|---|---|---|---|
| 646,738 | 4/1900 | Ingalls | 85/4 |
| 2,147,255 | 2/1939 | Hoppenstand | 339/273 R |
| 2,434,152 | 1/1948 | Forry | 287/114 X |
| 438,768 | 10/1890 | Reine | 287/54 |

FOREIGN PATENTS OR APPLICATIONS
1,327,199   4/1963   France............... 287/20.3

*Primary Examiner*—Andrew V. Kundrat
*Attorney*—Stepno & Neilan

[57] ABSTRACT

A connecting device for connecting together hollow members comprises a body having frusto-conically tapered bores and sleeves having bores of similar diameter to the outside diameter of members to be connected, said sleeves having complementarily tapered external surfaces for mating with the bores in said body so that a member carrying one of said sleeves can be passed through one of said tapered bores in said body and, by facing said sleeve into said tapered bore, positively connected to the body and to any other member or members similarly connected thereto.

1 Claim, 3 Drawing Figures

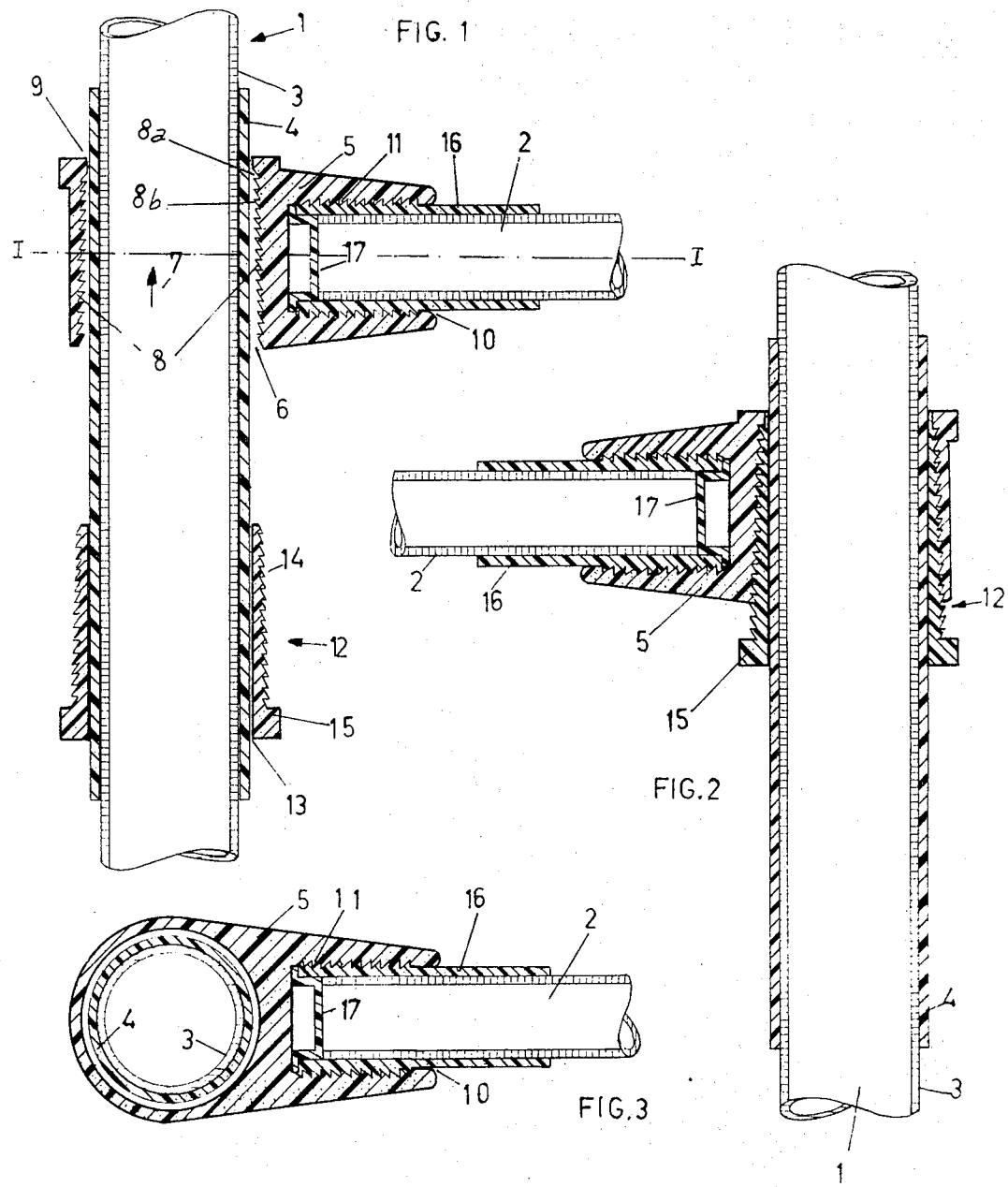

CONNECTING DEVICE

FIELD OF THE INVENTION

The present invention relates to a connecting device for connecting together hollow members, for example, steel tubes provided with a polyethylene or aluminium coating.

DESCRIPTION OF PRIOR ART

Reliable connection of two or more pipes to one another is a problem which arises daily in new forms in handicraft and industry. As a result, numerous proposals have also already been made as to how this may be effected with the greatest advantage. However, a particular difficulty arises when it is desired to connect tubes constructed from two or even more composite tubes constructed from two or even more different materials. In the case of such tubes which may, for example, be of steel provided with a polyethylene or aluminium coating and which are used whenever a tube is needed which is, on the one hand, strong and able to withstand high stress but, on the other hand is highly resistant to corrosion.

A specific example of such tubes are elements used in the construction of ladder-like steps, ladders, frames or the like, since in these applications quite high requirements are made with regard to immunity to attacks by moisture, chemical substances and temperature differences. Such elements also have to be reliably negotiable and load bearing even after long years of use, without the danger of fatigue of breakage occuring.

These requirements are fulfilled by the aforementioned steel tubes provided with a polyethylene or aluminium coating, but the problem as to how such tubes can be connected to one another has, until now, not been solved in a completely satisfactory manner. The use of metallic materials which have a sufficient strength is eliminated on account of the susceptibility thereof to corrosion. Welding of the steel tubes and applying a corrosion resistant coating, subsequently is very complicated and expensive and an additional disadvantage emerges in that the construction, once built-up, can no longer be modified, which renders the assembly unsuitable for many uses.

OBJECT OF THE INVENTION

It is an object of this invention to propose a connecting device for connecting hollow members, for example, steel tubes provided with a polyethylene or aluminium coating, which does not have the above discussed disadvantages and which, after connection, is not susceptible to corrosion.

Accordingly the invention provides a connecting device for use in connecting together hollow members, for example, steel tubes provided with a polyethylene or aluminium coating, comprising a body having a plurality of frusto-conically tapered bores, and an equal plurality of wedge sleeves each having a bore whose diameter corresponds to the outer diameter of a hollow member that is to be connected, the outer surfaces of said wedge sleeves being frusto-conically tapered and complementary to said bores in said body, said bores of said body and of said sleeves being so designed that any one of said wedge sleeves, surrounding a hollow member to be connected can be pressed in sef-locking manner into a selected one of said bores in the body, whereby the hollow member is clamped tightly to said body and to any other hollow member connected to said body.

In a preferred embodiment of connecting device in accordance with the invention, and for connecting a circular-sectioned continuous hollow member to an end of a bar extending perpendicularly thereto, the body has a continuous bore and a blind bore disposed perpendicularly thereto, the wedge sleeve for the continuous bore being provided with a circular, radially projecting edge on its great diameter end. Furthermore, it is advantageous that the wedge sleeve for the blind bore possesses a hermetically sealing cover at its smaller diameter end.

In order to achieve a particularly strong connection, the conical bores of the body are preferably provided, on their entire peripheries with a barb-like internal toothing and the wedge sleeves with a complementary barb-like external toothing.

Advantageously the barb-like toothing both in the bores of the body and on the outer surfaces of the wedge sleeves can be constituted by circular grooves each having a first flank disposed perpendicular to the axis of the bore or of the wedge sleeve and a second flank inclined thereto.

In order to guarantee secure fitting or seating of the wedge sleeves in the bores, the said second flanks of the grooves in the wedge sleeve are with advantage directed towards that end thereof having the smaller diameter, whilst in the case of the body they are turned towards that end of the bore having the greater diameter.

The connecting device can advantageously be made from an elastic plastic material. The invention includes within its scope, of course, structures incorporating the aforementioned connecting device.

DESCRIPTION OF A PREFERRED EMBODIMENT

The invention will be described further, by way of example, with reference to the accompanying drawings wherein :

FIG. 1 is a fragmentary cross-sectional elevation showing two hollow bars being connected together by a preferred embodiment of device conforming to the invention, connection not yet having been completed.

FIG. 2 is a view similar to that of FIG. 1 but with the connection completed.

FIG. 3 is a section along the line I—I of FIG. 1.

A preferred embodiment of device conforming to the invention is for use in connecting together a hollow element in the form of a continuous hollow bar 1 and an end of another hollow bar 2 arranged perpendicularly thereto. The hollow bar 1 comprises a steel jacket 3 provided with a shrunk-on polyethylene sheath 4 which surrounds and hermetically seals the steel jacket 3. The hollow bar 2 is of similar construction.

The connecting device comprises a body 5 having a frusto-conically tapered continuous bore 6, which has a diameter decreasing in the direction of the arrow 7. The angle of the inner surface of the bore in relation to the axis of the bore amounts, in this connection, to less than 10°, preferably about 5°.

The inner surface of the bore 6 is provided with toothing 8, which is constituted by circular grooves. Each individual groove possesses a first flank 8a, perpendicular to the axis of the bore, as well as a flank 8b inclined thereto. The arrangement of these flanks is such that the flanks 8a, and thus the toothing, are directed towards that end 9 of the bore 6 which has the smaller diameter.

Furthermore, the body 5 is provided with a second blind bore 10 which is arranged perpendicularly to the continuous bore 6 and which tapers frusto-conically towards its closed end. On its inner surface there is provided toothing 11 similar to that on the bore 6. The toothing 11 is formed by circular grooves whose first flanks, extend perpendicularly to the axis of the bore, and whose second flanks, and thus the toothing, are directed towards the inner end of the blind bore 10.

The connecting device of the invention also comprises a wedge sleeve 12 intended for pressing into the continuous bore 6. The sleeve 12 has a uniform circular-sectioned bore 13 whose diameter corresponds to the outer diameter of the hollow bar 1. The outer shape of the sleeve 12 is substantially frusto-conical in such a way that its outside diameter decreases in diameter in the direction of the arrow 7. This outer surface is provided with toothing 14 which is formed from grooves and is complementary to the toothing 8 of the bore 6, that is to say the second flanks, of the grooves thereof, extend perpendicularly to the axis of the bore 13 and the second flanks of the grooves and thus the toothing 14 are directed towards the end of the sleeve 12 having the greater diameter. Finally, the wedge sleeve 12 is provided with an annular bead 15 which prevents too deep a pressing-in of the sleeve 12 into the bore 6.

In order to establish a secure connection of the hollow bars 1 and 2 to one another, sleeve 12 is initially slipped onto the hollow bar 1, and this latter is passed through the bore 6 of the connecting body. After the wedge sleeve 12 has been brought into the right position on the hollow bar 1, the sleeve 12 is shifted, along with the bar, in the direction of the arrow 7, until it engages, with its toothing 14, into the toothing 8 of the bore. Then the sleeve is pressed into the bore until it butts with its bead 15 against the edge of the body 5. Because of the conicity of the bore 6 and of the sleeve 12, a high pressure directed radially inwards arises so that the sleeve 12 is pressed securely onto the surface 4 of the tube 1. Thus an immovable connection between connecting body 5 and rod 1 is produced, since the toothings 8 and 14 are in engagement and the perpendicular flanks of these toothings are supported against one another and withdrawal of the sleeve is rendered impossible.

The attachment of the hollow bar 2 to the connecting body 5 is effected in corresponding manner, or the possibility exists, as represented in the drawing, that the polyethylene coating of the tube 2 is itself provided with toothing. By this means, the use of a separate sleeve is no longer necessary. In order to ensure complete sealing of the hollow rod 2, a cover 17 is additionally provided which is pressed into the end of the hollow bar 2 and hermetically seals the interior of the same.

The invention is not limited to the precise details of the foregoing example and numerous other embodiments of the connecting device are, of course, conceivable. For example in a device for the connection of two intersecting pipes, the body can be provided with two continuous bores arranged next to one another, or more than two bores for the connection of several tubes to one another can be provided. A connecting device for the butt coaxial connection of two hollow bars could be provided with blind-end bores arranged coaxially and which lie opposite one another and into each of which a respective one rod end can be inserted and fixed with one wedge sleeve. With the connecting device of the invention the possibility exists of connecting virtually any desired number of hollow bars in any desired positions to one another securely and durably. Weakening of the connection, be it through corrosion or through fatigue phenomena, can be successfully counteracted. "Nylon" is a particularly advantageous material both for the body and for the wedge sleeves, but the possibility also exists of using another resistant plastic of elastic nature. A particular advantage of the connecting device also consists in that the hollow bars can be joined together on the spot during assembly. If, by way of example, a number of hollow bars are to be joined together into a ladder, and which are to be anchored in the brickwork, it is an advantage to be able to compensate any possible inaccuracies arising from the boring of the holes in the brickwork.

I claim:

1. A connecting device for use in connecting together a continuous hollow bar and a hollow bar extending perpendicularly thereto comprising a body having a frusto-conically tapered continuous bore and a frusto-conically tapered blind bore arranged perpendicularly thereto, and a pair of wedge sleeves each having a bore whose diameter corresponds to the outer diameter of a hollow member that is to be connected, the outer surfaces of said wedge sleeves being frusto-conically tapered and complementary to said bores in said body, said wedge sleeve for said continuous bore being provided with a circular, radially projecting edge on its larger diameter, and said wedge sleeve for the blind bore having a hermetically sealing cover on its smaller diaemter end for sealing the end of a tube inserted therein, said bores of said body and of said sleeves being so designed that any one of said wedge sleeves surrounding a hollow member to be connected can be pressed in self-locking manner into a selected one of said bores in the body whereby the hollow member is clamped tightly to said body and to any other hollow member connected to said body.

* * * * *